Feb. 28, 1961  W. C. EDDY, JR  2,973,067
TORQUE RESPONSIVE CONTROL DEVICE
Filed Aug. 12, 1958  2 Sheets-Sheet 1

INVENTOR.
WILLIAM C. EDDY, JR.
BY  M. A. Hobbs
ATTORNEY

Feb. 28, 1961 W. C. EDDY, JR 2,973,067
TORQUE RESPONSIVE CONTROL DEVICE
Filed Aug. 12, 1958 2 Sheets-Sheet 2
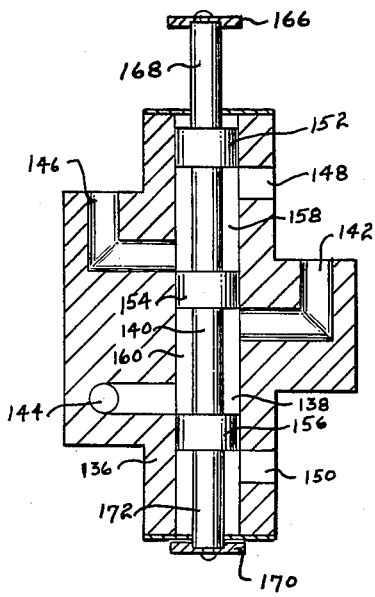
FIG. 3
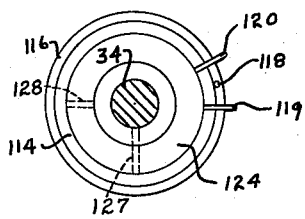
FIG. 4
FIG. 5
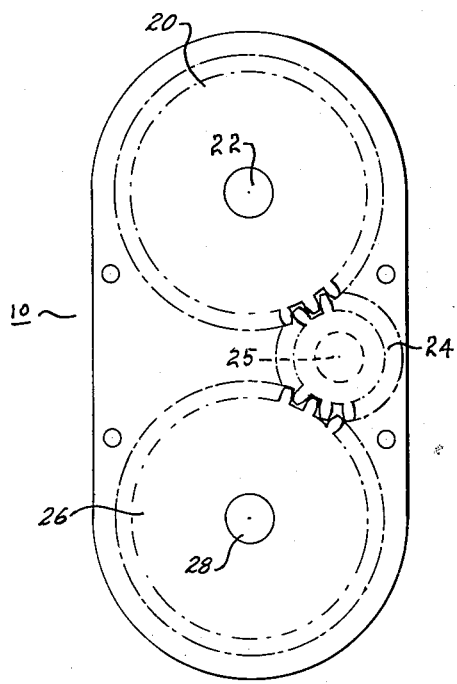
FIG. 6
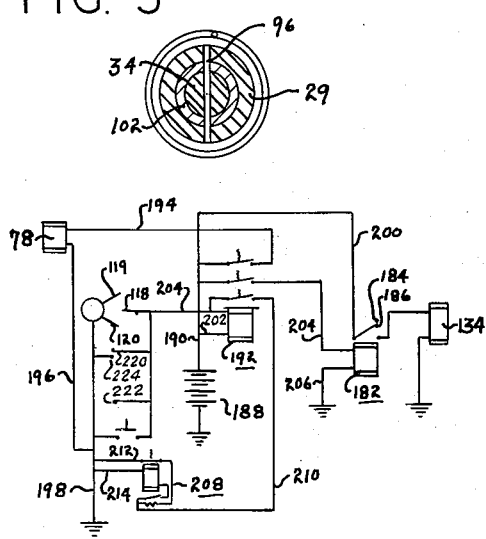
FIG. 7
INVENTOR.
WILLIAM C. EDDY, JR.
BY M. A. Hobbs
ATTORNEY

United States Patent Office 2,973,067
Patented Feb. 28, 1961

2,973,067

TORQUE RESPONSIVE CONTROL DEVICE

William C. Eddy, Jr., Michigan City, Ind., assignor to Television Associates, Inc., Michigan City, Ind., a corporation of Illinois Filed Aug. 12, 1958, Ser. No. 754,595

10 Claims. (Cl. 192—.034)

The present invention relates to machines utilizing torque as a cutting or feeding force, such as drill presses, tapping machines and lathes and more particularly to machines of this type having a torque responsive control.

One of the principal objects of the present invention is to provide a torque responsive control unit for drilling and tapping machines, which senses overload condition during the machining operation and responds immediately to the condition to alternately reverse the direction of rotation on the tool until the overload condition is relieved or until the machine is stopped.

Another object of the invention is to provide a torque responsive control mechanism for machine tool equipment employing a torque force for either the machining or feeding operation, which can readily be adjusted to predetermined maximum loads and which will permit the machine to operate in the same manner as if the mechanism were not installed thereon, except when load conditions on the tool approach the point where damage to the machine or cutting tool might occur.

Still another object of the present invention is to provide an overload responsive mechanism for machines using torque as a driving force, which can be built integrally into the machine or installed as a separate unit and which can be used in conjunction with standard or conventional power drive equipment without modifications in said equipment being required.

Another object of the invention is to provide a mechanism for driving a rotative power tool, which senses overloading condition and immediately interrupts the operation by declutching the power drive to the tool.

Additional objects and advantages will become apparent from the following description and accompanying drawings, wherein:

Figure 3 is an enlarged cross sectional view of a valve incorporated in the present torque responsive control mechanism taken on line 3—3 of Figure 1;

Figure 4 is a cross sectional view of a portion of the control mechanism taken on line 4—4 of Figure 2;

Figure 5 is a cross sectional view of another portion of the control mechanism taken on line 5—5 of Figure 2;

Figure 6 is a plan view of the drive mechanism of the tapping machine; and

Figure 7 is a schematic diagram of a suitable control circuit for my mechanism.

Figures 1, 2:
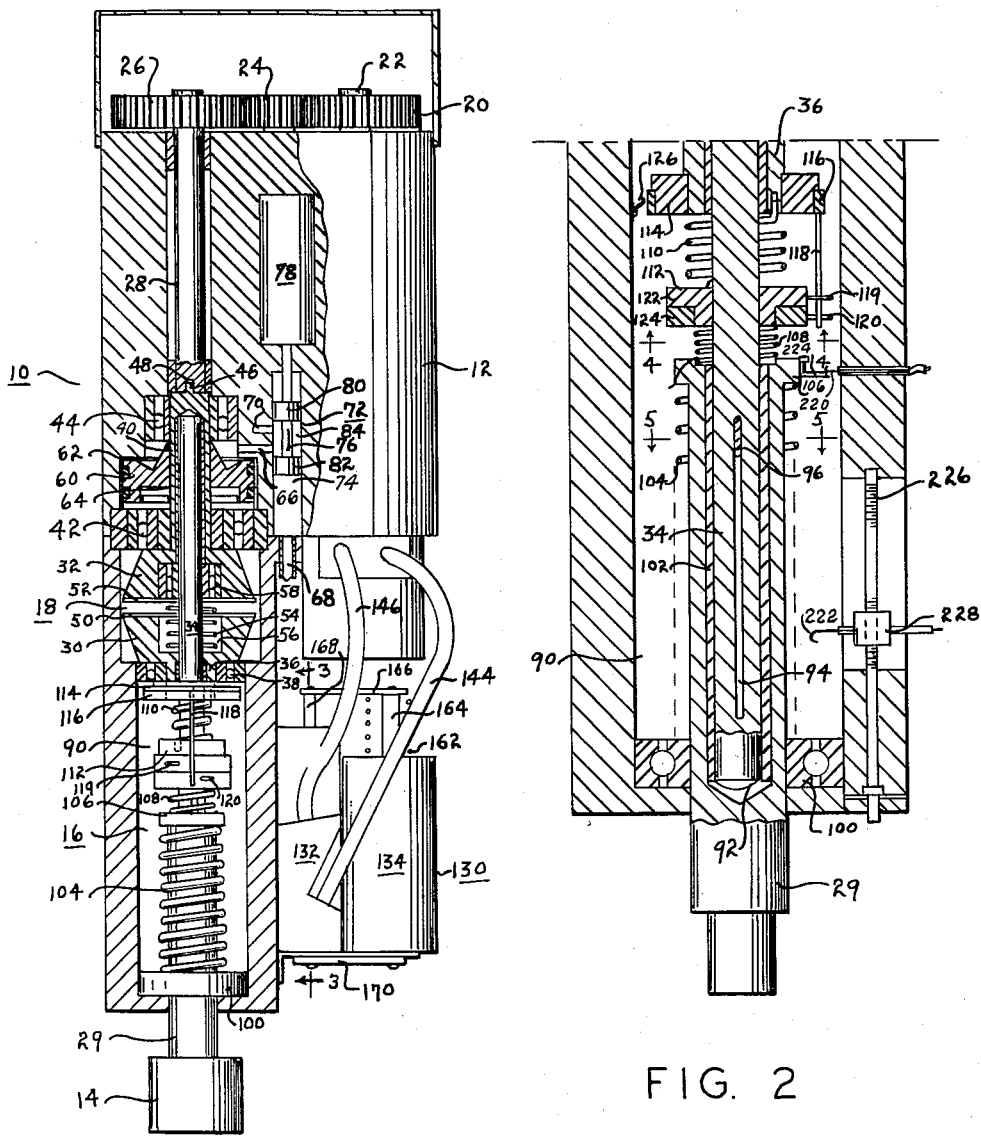
Figure 1 is a partial vertical cross sectional and elevational view of a tapping machine embodying the present invention.
Figure 2 is an enlarged cross sectional view of the torque sensing mechanism shown in Figure 1 and forming a part of the present invention.

The present overload responsive mechanism is adaptable to a variety of operations and a number of different types of machines which employ a torque force for the cutting tool and can be incorporated in machines wherein the tool is moved and the work piece is held stationary or with machines wherein the tool is held stationary and the work piece is moved. The present control mechanism is particularly adapted to tapping and drilling operations and for the purpose of illustrating the invention will be described in connection with a tapping mechanism using a conventional pneumatic or electrical motor. In the type of machine illustrated herein the feed and return of the cutting tool to its initial starting position are controlled automatically by a suitable control mechanism and circuit of well known and standard design and will not be shown or described here.

Referring more specifically to the drawings and to Figure 1 in particular, numeral 10 designates generally a tapping unit embodying the present invention, 12 the housing of a conventional pneumatic motor, 14 a chuck for holding a tapping tool, 16 a torque sensing mechanism, and 18 a clutch and operating mechanism therefor. Motor 12 is not shown in detail since the type employed is readily available on the market and, for the purpose of the present description, may be considered as a standard reversible type pneumatic motor. Gear 20 mounted on the motor shaft 22 drives an idle gear 24 mounted on shaft 25, the latter gear in turn driving a gear 26 secured to the upper end of shaft 28. The gears are enclosed in a casing secured on the upper end of unit 10. Chuck 14 is driven by motor 12 through gears 20, 24 and 26 mounted in the upper end of the unit, shaft 28, clutch mechanism 18, torque sensing mechanism 16, and shaft 29 extending from the lower part of the unit housing. The present control mechanism embodies some of the features specifically disclosed and claimed in my copending application Serial No. 666,633, filed June 19, 1957, now Patent No. 2,918,999, issued December 29, 1959.

The clutch 18 consists of a rotatable plate 30 and an axially movable rotatable plate 32, plate 30 being mounted on a shaft 34 for relative rotation therewith and having a cylindrical extension 36 axially aligned with shaft 34 and being journaled in a race of ball bearings 38. Bearing 38 is rigidly mounted in the tapper housing and forms an abutment for the lower side of plate 30 and a rotatable support for shaft 34. Plate 32 is rotatably mounted on shaft 34 and has a cylindrical extension 40 journalled in a ball bearings 42 and 44 and keyed to the lower end of shaft 28 by projection 46 on the upper end of the extension and slot 48 in the lower end of shaft 28. The two clutch plates are provided with suitable friction surfaces 50 and 52 and are constantly urged apart, i.e. to the declutched position, by a coil spring 54 seated in a recess 56 in the upper portion of plate 30 and reacting against a bearing 58 in the lower portion of plate 32. Plate 32 and cylindrical extension 40 slide axially on shaft 34 and are moved away from plate 30 by spring 54 and toward plate 30 into the clutched position by a pneumatic piston 60 disposed in a cylindrical chamber 62 in the tapper housing and mounted on and secured to extension 40, the lower edge of the part of the piston defining the central hole seating firmly on an annular shoulder 64 on the external surface of extension 40.

Air under pressure is admitted into chamber 62 above piston 60 through conduits 66 and 68 and is permitted to escape therefrom through conduits 66 and 70, the admission and escape of the air through these conduits being controlled by a valve 72. This valve consists of a cylinder 74 connected with chamber 62 by conduit 66, with a source of air under pressure by conduit 68, and with the atmosphere by conduit 70 and a piston 76 in said cylinder connected to and moved axially therein by a solenoid 78. Piston 76 is provided with two lands 80 and 82 and an intervening recessed portion 84 and when the piston is in the position shown, i.e. with the solenoid deenergized, recessed portion 84 connects chamber 62 with conduit 70, thus permitting spring 54 to separate plates 30 and 32 and declutch the tapper. When the solenoid is energized, piston 76 is in raised position held with land 82 between conduits 66 and 70, thus interrupting the flow of air from chamber 62 and permitting communication between conduits 66 and 68 and the admission of compressed air into chamber 62. A spring (not shown) returns piston 76 to the position shown in Figure 1 when the solenoid is deenergized.

Shaft 34, which is journalled in and supported by bearings 38, 42 and 44, extends into compartment 90 in which the torque mechanism is located and into an axial bore 92 in shaft 29, and is keyed by slot 94 and pin 96 with the latter shaft so that the two shafts rotate constantly in unison. The slot and pin permit axial movement downwardly of shaft 29 so that the tapping die can feed itself onto the blank being threaded without movement of the entire tapping unit. Shaft 29 is supported for both axial and rotative movements by bearing 100 rigidly mounted in the lower part of the tapper housing and by shaft 34 with an interverting snug fitting sleeve 102. After the tapping operation has been completed or interrupted, shaft 29 is returned to its initial starting position, as shown in Figure 1, by a coil spring 104 mounted on shaft 29 and reacting between the inner face of bearing 100 and an annular shoulder 106 on the upper end of said shaft. The return of shaft 29 to its original position is cushioned by spring 108.

The driving force for the tapping tool is transmitted from clutch 18 through a spring 110 mounted around shaft 34 and connected at its upper end to clutch plate extension 36 and at its lower end to a collar 112 mounted on and rigidly secured to shaft 34 by a set screw (not shown). Spring 110 is relatively strong and retains extension 36 and collar 112 in a fixed position relative to one another during all normal operations of the tapper, thus causing shaft 34 and plate 30 to rotate in unison under those conditions. When overload conditions in the tapper die are encountered, spring 110 yields and permits slight relative rotation to occur between shaft 34 and extension 36. This relative rotation is utilized to sense the overload condition and to transmit a signal to the clutch and motor control mechanisms. Mounted rigidly on the lower end of extension 36 is an electrical nonconducting collar 114 with an electrical conducting ring 116 secured thereto and carrying an electrical contact element 118 projecting downwardly parallel to and spaced from shaft 34 to approximately the lower edge of metal collar 112. This element is also spaced outwardly from the collar and is adapted to contact pins 119 and 120 projecting radially from the periphery of collar 112, as seen in Figures 2 and 4, pin 119 being seated in the upper annular part 122 of the collar and pin 120 being seated in the lower annular part 124 of the collar. Pins 119 and 120 are adjustable circumferentially relative to element 118 by loosening the set screws 127 and 128 in the respective collar parts 122 and 124 and rotating each part in one or the other direction until the desired position of the respective pin is obtained, and then tightening the set screw to retain the parts in their newly adjusted positions. Element 118 is connected by a fixed contact 126 to an electrical control circuit and pins 119 and 120 are grounded through metal collar parts 122 and 124, respectively. The strength of spring 110 and the position of pins 119 and 120 determine the degree of torque required to actuate the torque responsive control mechanism during overload condition.

The control mechanism for the pneumatic motor is shown at numeral 130 mounted on the side of the unit housing beneath the motor and consists of a valve 132 and a solenoid 134 for operating the valve. The solenoid being of conventional construction will not be described in detail herein. The valve is shown in detail in Figure 3 and consists of a valve housing 136, cylindrical chamber 138, slidable valve element 140, inlet air passage 142 and outlet passages 144 and 146, the former outlet passage supplying air to the motor for forward rotation and the latter passage for reverse rotation. Chamber 138 is connected with the atmosphere by two air exhaust ports 148 and 150. Valve element 140 is generally cylindrical in shape and contains three separate lands 152, 154, and 156 with recesses 158 and 160 therebetween. When the valve element is in the position shown, i.e. in the raised position, air inlet passage 142 is connected with passage 144 supplying air to the motor for driving the motor forward, and passage 146 serving as an air exhaust for the motor is connected to exhaust port 148. The valve is held in this raised position by spring 162 mounted on the end of the solenoid plunger 164 and connected to the valve by lever 166 and stem 168. The opposite end of the solenoid plunger is also connected to the valve element by lever 170 and stem 172. When the solenoid is energized in response to actuation of the torque sensing mechanism 16, valve element 140 is moved downwardly until land 152 is disposed between passage 146 and port 148, land 154 is disposed between passages 142 and 144, and land 156 is positioned below port 150. With the valve element in this position air flows to the motor through passages 142 and 146 to and from the motor through passage 146 and port 150, thus driving the motor in the reverse direction. When the solenoid is deenergized spring 162 returns the valve element to the position shown in Figure 3 to drive the motor in the forward direction.

The circuitry for the overload mechanism is shown diagrammatically in Figure 7, wherein solenoid 78 for controlling the operation of the clutch and solenoid 134 for controlling the operation of the motor are shown schematically. A latching relay 182 switches the current alternately between contacts 184 and 186 in response to a signal from the control circuitry. Solenoid 78 is connected to a source of power, shown in Figure 7 as a battery 188, by lead 190, relay 192 and lead 194 and is grounded through leads 196 and 198, and solenoid 134 is connected to the battery by leads 190 and 200 and latching relay 182.

In the event an overload condition develops in the equipment such that shaft 34 rotates relative to extension 36 in opposition to spring 110 until contact element 118 engages contact element 119, relay 192 is energized through a circuit consisting of leads 190 and 202 connecting the relay with battery 188 and lead 204, contacts 118 and 119 and ground 198. When the relay 192 is actuated, latching relay 182 is operated through leads 204 and 206 to reverse motor 12, and a time delay relay 208 is operated through leads 210, 212 and 214 to delay the deenergization of magnet 78 until the motor has had sufficient time to reverse its rotation. The motor continues to operate in reverse until relay 192 is again actuated, either by the closing of a contact 120 or one of the limit contacts 220 or 222. Contact elements 118 and 120 are held in spaced position by spring 110 until an overload condition develops while the motor is operating in reverse. When this condition occurs the force of spring 110 is overcome and shaft 34 rotates relative to extension 36, causing contact 118 to engage contact 120, thus closing the circuit to relay 192 and again operating latching relay 182 to reverse the rotation of the motor to its forward direction. Contacts 220 and 222 are closed by contact 224 mounted on longitudinally movable shaft 29 engaging the respective contact when shaft 29 reaches its maximum travel as determined by the setting on adjustment screw and tap 226 and 228.

In the operation of the foregoing tapper unit, starting with valves 72 and 132 in the position shown in Figures 1 and 3, respectively, the air control valve for conduits 68 and 142 is opened admitting air through valve 132 and passage 144 to drive motor 12 in the forward direction and admitting air through valve 72 and conduit 66 into chamber 62 moving piston 60 downwardly and engaging clutch plates 30 and 32. The rotative force of clutch plate 30 is transmitted through extension 36, spring 110, and collar 112, shaft 34 and key 96 to shaft 29 on which the tapping tool is mounted. As the tapping operation proceeds, the tool being self-fed into the work piece pulls shaft 29 longitudinally downwardly on shaft 34 with key 96 sliding in slot 94 continuing to transmit the torque from shaft 34 to shaft 29 and then to the tool. In the event the tool becomes choked or otherwise binds in the work piece, the torque on shafts 29 and 34 immediately increases and, when a predetermined limit is reached, as determined by the strength of spring 110, shaft 34 rotates relative to extension 36 sufficiently to permit element 118 to contact pin 119 thereby closing the circuits controlling solenoids 78 and 134. When solenoid 78 is energized piston 76 of valve 72 is moved downwardly until land 82 is positioned between conduit 66 and conduit 68, and recess 84 is connecting conduit 66 and exhaust conduit 70; hence the pressure in chamber 62 is relieved and piston 60 and clutch plate 32 are returned to their uppermost position by spring 54, and the unit is declutched.

As the declutching operation just described is taking place, piston 136 of valve 132 is moved by solenoid 134 from the position shown in Figure 3 to the position where recess 158 is connecting air inlet passage 142 with conduit 146 and recess 160 is connecting conduit 144 with exhaust port 150, thus reversing the operation of motor 12, and, after the delay produced by relay 208 has occurred, solenoid 78 is deenergized returning valve piston 76 to the position to admit air into chamber 62 for engaging the clutch. The motor continues to operate in the reverse direction until manually controlled or automatically by a predetermined setting or by the closing of contacts 118 and 120. Contacts 118 and 120 are held in spaced position by spring 110 until an overload condition develops while the motor is operating in reverse. When this condition occurs the force of spring 110 is overcome and shaft 29 rotates relative to extension 36 causing contact 118 to engage contact 120, thus reenergizing solenoid 78 to disengage clutch plates 30 and 32 and deenergizing solenoid 134 to reverse motor 12 to its normal forward direction of rotation. When this operation has been completed solenoid 78 is again deenergized and the clutch plates are reengaged.

While only one embodiment of the present invention has been described herein, various changes and modifications may be made without departing from the scope of the inventive concept.

I claim:

1. A rotary tool drive mechanism with an overload mechanism therein, comprising a chuck for a tapping tool, a pneumatic motor for driving said chuck, a shaft having a longitudinal slot near one end, a means for operatively connecting the other end of said shaft with said motor, a second shaft axially aligned with said first shaft and having an axially aligned recess receiving the end of said first mentioned shaft having the slot therein, a key secured to said last mentioned shaft and extending through said slot, a spring mounted around said last mentioned shaft for urging said last mentioned shaft onto said first mentioned shaft, a longitudinally movable clutch plate rotatably mounted on said first mentioned shaft and operatively connected to said means, a second clutch plate rotatably mounted on said first mentioned shaft between said first mentioned clutch plate and said second mentioned shaft for cooperation with said first plate, a spring urging said plates apart, walls forming a chamber in alignment with said first mentioned plate, a piston in said chamber connected to said first mentioned plate, a conduit connecting said chamber with a source of air under pressure, a valve in said conduit, a collar mounted around said first mentioned shaft and rigidly connected to said second mentioned plate, a pair of collars mounted around and rigidly connected to said first mentioned shaft, the collars of said pair being rotatively adjustable on said shaft and to each other, a calibrated spring mounted around said first mentioned shaft, one end being connected to said first mentioned collar and the other end to one of the collars of said pair, an electrical contact element in the periphery of each collar of said pair, an electrical contact element secured to said first mentioned collar and adapted to contact said first mentioned contacts when a predetermined torque is reached, conduits connecting said motor with a source of air under pressure, a valve for controlling the direction of flow of air through said conduits and thereby controlling the direction of rotation of said motor, electrical means controlling said first mentioned valve and controlled by said contacts for clutching and declutching said movable clutch plate, and electrical means controlling said second mentioned valve and controlled by said contacts for changing the direction of rotation of said motor.

2. A rotary tool drive mechanism with an overload mechanism therein, comprising a chuck for a tool, a pneumatic motor for driving said chuck, a shaft having a longitudinal slot near one end, a means for operatively connecting the other end of said shaft with said motor, a second shaft axially aligned with said first shaft and having an axially aligned recess receiving the end of said first mentioned shaft having the slot therein, a pin secured to said last mentioned shaft and extending into said slot, a spring mounted around said last mentioned shaft for urging said last mentioned shaft onto said first mentioned shaft, a longitudinally movable clutch plate rotatably mounted on said first mentioned shaft and operatively connected to said means, a second clutch plate rotatably mounted on said first mentioned shaft between said first mentioned clutch plate and said second mentioned shaft for cooperation with said first plate, a spring urging said plates apart, walls forming a chamber, a piston in said chamber connected to said first mentioned plate, a conduit connecting said chamber with a source of air under pressure, a valve in said conduit, a collar mounted around said first mentioned shaft and rigidly connected to said second mentioned plate, a pair of collars mounted around said first mentioned shaft and rigidly connected to said shaft, the collars of said pair being rotatively adjustable on said shaft and to each other, a calibrated spring mounted around said first mentioned shaft, one end being connected to said first mentioned collar and the other end to one of the collars of said pair, an electrical contact element in each collar of said pair, an electrical contact element secured to said first mentioned collar and adapted to contact said first mentioned contacts when a predetermined torque is reached, conduits connecting said motor with a source of air under pressure, a valve for controlling the direction of flow of air through said conduits and thereby controlling the direction of rotation of said motor, electrical means controlling said first mentioned valve controlled by said contacts for clutching and declutching said movable clutch plate, and electrical means controlling said second mentioned valve and controlled by said contacts for changing the direction of rotation of said motor.

3. A rotary tool drive mechanism with an overload mechanism therein, comprising a chuck for a tool, a pneumatic motor for driving said chuck, a shaft, a second shaft axially aligned with and driven by said first shaft and supporting said chuck, a clutch plate rotatably mounted on said first mentioned shaft and operatively connected to said motor, a second clutch plate rotatably mounted on said first mentioned shaft between said first mentioned clutch plate and said second mentioned shaft for cooperation with said first plate, a spring urging said plates apart, walls forming a chamber, a piston in said chamber connected to said first mentioned plate, a conduit connecting said chamber with a source of air under pressure, a valve in said conduit, a control means for said valve including a collar mounted around said first mentioned shaft and rigidly connected to said second mentioned plate, a pair of collars mounted around and rigidly connected to said first mentioned shaft, the collars of said pair being rotatively adjustable on said shaft and to each other, and a calibrated spring mounted around said first mentioned shaft, one end being connected to said first mentioned collar and the other end to one of the collars of said pair.

4. A rotary tool drive mechanism with an overload mechanism therein, comprising a chuck for a tool, a pneumatic motor for driving said chuck, a shaft, a second shaft axially aligned with and driven by said first shaft and supporting said chuck, a longitudinally movable clutch plate rotatably mounted on said first mentioned shaft and operatively connected to said motor, a second clutch plate rotatably mounted on said first mentioned shaft between said first mentioned clutch plate and said second mentioned shaft for cooperation with said first plate, a spring urging said plates apart, walls forming a chamber, a piston in said chamber connected to said first mentioned plate, a conduit connecting said chamber with a source of air under pressure, a valve in said conduit, a collar mounted around said first mentioned shaft and rigidly connected to said second mentioned plate, a collar mounted around and rigidly connected to said first mentioned shaft, a calibrated spring mounted around said first mentioned shaft, one end being connected to said first mentioned collar and the other end to said second mentioned collar, contacts on said collars for completing an electrical circuit when a predetermined torque is applied to said spring, conduits connecting said motor with a source of air under pressure, a valve for controlling the direction of flow of air through said conduits and thereby controlling the direction of rotation of said motor, electrical means controlling said first mentioned valve and controlled by said contacts for clutching and declutching said movable clutch plate, and electrical means controlling said second mentioned valve and controlled by said contacts for changing the direction of rotation of said motor.

5. A rotary tool drive mechanism with an overload mechanism therein, comprising a chuck for a tool, a pneumatic motor for driving said chuck, a shaft operatively connected to said chuck, a means operatively connecting the shaft with said motor including a clutch and a pneumatic means for operating said clutch, a collar mounted for rotation on said shaft and connected to said clutch, a pair of collars mounted around and rigidly connected to said shaft, the collars of said pair being rotatively adjustable on said shaft and to each other, a calibrated spring mounted around said shaft, one end being connected to said first mentioned collar and the other end to one of the collars of said pair, an electrical contact element in each collar of said pair, an electrical contact element secured to said first mentioned collar and adapted to contact said first mentioned contacts when a predetermined torque is reached, conduits connecting said motor with a source of air under pressure, a valve for controlling the direction of flow of air through said conduits and thereby controlling the direction of rotation of said motor, and electrical means controlling said pneumatic means and said valve and controlled by said contacts for changing the direction of rotation of said chuck.

6. A rotary tool drive mechanism with an overload mechanism therein, comprising a chuck for a tool, a pneumatic motor for driving said chuck, a shaft operatively connected to said chuck, a means operatively connecting the shaft with said motor including a clutch and a pneumatic means for operating said clutch, a collar mounted for rotation on said shaft and connected to said clutch, a collar mounted around and rigidly connected to said shaft, a calibrated spring mounted around said shaft, one end being connected to said first mentioned collar and the other end to said second mentioned collar, contacts on said collars for completing an electrical circuit when a predetermined torque is applied to said spring, and electrical means controlled by said contacts controlling said pneumatic means and said motor for changing the direction of rotation of said chuck.

7. A rotary tool drive mechanism with an overload mechanism therein, comprising a tool holding device, a motor for driving said device, a shaft operatively connected to said device, a means operatively connecting said shaft with said motor including a longitudinally movable clutch plate rotatably mounted on said shaft, a second clutch plate rotatably mounted on said shaft for cooperation with said first plate, a spring urging said plates apart, walls forming a chamber, a piston in said chamber connected to said first mentioned plate, a conduit connecting said chamber with a source of air under pressure, a valve in said conduit, a collar mounted for rotation on said shaft and rigidly connected to said second mentioned plate, a pair of collars mounted around and rigidly connected to said shaft, the collars of said pair being rotatively adjustable on said shaft and to each other, a calibrated spring mounted around said shaft, one end being connected to said first mentioned collar and the other end to one of the collars of said pair, an electrical contact element in each collar of said pair, an electrical contact element secured to said first mentioned collar and adapted to contact said first mentioned contacts when a predetermined torque is reached, electrical means controlling said first mentioned valve and controlled by said contacts for clutching and declutching said movable clutch plate, and electrical means controlled by said contacts for reversing the direction of rotation of said device.

8. A rotary tool drive mechanism with an overload mechanism therein, comprising a tool holding device, a motor for driving said device, a shaft operatively connected to said device, a means operatively connecting the shaft with said motor including a clutch and a pneumatic means for operating said clutch, a collar mounted around said shaft and rigidly connected to said clutch, a second collar mounted around and rigidly connected to said shaft, a calibrated spring mounted around said shaft, one end being connected to said first mentioned collar and the other end to said second mentioned collar, contacts on said collars for completing an electrical circuit when a predetermined torque is applied to said spring, and electrical means controlled by said contacts for reversing the direction of rotation of said motor and controlling the operation of said pneumatic means.

9. A rotary tool drive mechanism with an overload mechanism therein, comprising a tool holding device, a motor for driving said device, a shaft operatively connected to said device, a means operatively connecting said shaft with said motor including a clutch plate rotatably mounted on said shaft, a second clutch plate rotatably mounted on said shaft for cooperation with said first plate, a spring urging said plates apart, walls forming a chamber, a piston in said chamber connected to said first mentioned plate, a conduit connecting said chamber with a source of air under pressure, a valve in said conduit, a torque responsive means operatively connected to said shaft and having a pair of electrical contacts, electrical means controlling said valve and controlled by said contacts for clutching and declutching said movable clutch plate, and electrical means controlled by said contacts for reversing the direction of rotation of said motor.

10. A rotary tool drive mechanism with an overload mechanism therein, comprising a tool holding device, a motor for driving said device, a shaft operatively connected to said device, a means operatively connecting said shaft with said motor including a clutch and a pneumatic means for operating said clutch, a torque responsive means operatively connected to said shaft and having a pair of electrical contacts, and electrical means controlled by said contacts for reversing the direction of rotation of said motor and controlling the operation of said pneumatic means.

References Cited in the file of this patent

UNITED STATES PATENTS

| | | |
|---|---|---|
| 2,237,170 | Williamson | Apr. 1, 1941 |
| 2,277,554 | McCoy | Mar. 24, 1942 |
| 2,720,803 | Rice et al. | Oct. 18, 1955 |
| 2,842,240 | Rice et al. | July 8, 1958 |